US012602747B2

(12) United States Patent
Zhu et al.

(10) Patent No.: US 12,602,747 B2
(45) Date of Patent: Apr. 14, 2026

(54) METHOD AND APPARATUS FOR DENOISING A LOW-LIGHT IMAGE

(71) Applicant: INTELLINDUST INFORMATION TECHNOLOGY (SHENZHEN) CO., LTD, Shenzhen (CN)

(72) Inventors: Caizhi Zhu, Shenzhen (CN); Lin Wang, Shenzhen (CN); Xiao Zhou, Shenzhen (CN); Peizhe Ru, Shenzhen (CN)

(73) Assignee: INTELLINDUST INFORMATION TECHNOLOGY (SHENZHEN) CO., LTD, Shenzhen (CN)

( * ) Notice: Subject to any disclaimer, the term of this patent is extended or adjusted under 35 U.S.C. 154(b) by 358 days.

(21) Appl. No.: 18/026,081

(22) PCT Filed: Dec. 27, 2022

(86) PCT No.: PCT/CN2022/142230
§ 371 (c)(1),
(2) Date: Mar. 13, 2023

(87) PCT Pub. No.: WO2023/125503
PCT Pub. Date: Jul. 6, 2023

(65) Prior Publication Data
US 2024/0311973 A1     Sep. 19, 2024

(30) Foreign Application Priority Data

Dec. 29, 2021     (CN) .......................... 202111641889.8

(51) Int. Cl.
*G06T 5/60*      (2024.01)
*G06T 5/10*      (2006.01)
*G06T 5/70*      (2024.01)

(52) U.S. Cl.
CPC ................. *G06T 5/60* (2024.01); *G06T 5/10* (2013.01); *G06T 5/70* (2024.01);
(Continued)

(58) Field of Classification Search
CPC .... G06T 5/60; G06T 5/10; G06T 5/70; G06T 2207/20048; G06T 2207/20081;
(Continued)

(56) References Cited

U.S. PATENT DOCUMENTS 12,198,310 B2 * 1/2025 Duan ........................ G06T 5/20
2012/0224789 A1 * 9/2012 Chatterjee ............. G06T 3/4015
382/275
(Continued)

FOREIGN PATENT DOCUMENTS

CN      110766621 A      2/2020
CN      110992272 A      4/2020
(Continued)

OTHER PUBLICATIONS

Ratnasingam, Sivalogeswaran. "Deep camera: A fully convolutional neural network for image signal processing." Proceedings of the IEEE/CVF International Conference on Computer Vision Workshops. 2019. (Year: 2019).*
(Continued)

*Primary Examiner* — Stephen R Koziol
*Assistant Examiner* — Joshua Chen
(74) *Attorney, Agent, or Firm* — Cozen O'Connor

(57) ABSTRACT

Examples of the present disclosure provide a method and an apparatus for denoising a low-light image, wherein the method includes: acquiring a low-light image in RAW domain; performing a preset image enhancement transformation on the low-light image in the RAW domain, and inputting the transformed image into a pre-trained denoising network model to obtain an output image; wherein, the
(Continued)

denoising network model is trained based on sample images, and the sample images include a low-light image with simulated dead pixels and a noiseless image; performing an inverse transformation of the preset image enhancement transformation on the output image to obtain a denoised image. It can significantly reduce the influence of dead pixels of images on the process of denoising the low-light image and improve the quality of low-light image denoising.

10 Claims, 4 Drawing Sheets

(52) U.S. Cl.
CPC ............... *G06T 2207/20048* (2013.01); *G06T 2207/20081* (2013.01); *G06T 2207/20084* (2013.01)

(58) Field of Classification Search
CPC . G06T 2207/20084; G06T 2207/10024; G06T 2207/20172; G06N 3/08; G06N 3/045
See application file for complete search history.

(56) References Cited

U.S. PATENT DOCUMENTS

| | | | |
|---|---|---|---|
| 2017/0278221 A1 | 9/2017 | Ji et al. | |
| 2019/0096038 A1* | 3/2019 | El-Khamy | ........... G06N 3/0464 |
| 2020/0319102 A1* | 10/2020 | Thon | .................. G01N 15/1433 |
| 2023/0080693 A1* | 3/2023 | Hu | ............................. G06T 5/70 |
| | | | 382/275 |
| 2023/0230206 A1* | 7/2023 | Al | ............................. G06T 5/20 |
| | | | 382/159 |

FOREIGN PATENT DOCUMENTS

| | | |
|---|---|---|
| CN | 111402153 A | 7/2020 |
| CN | 112529775 A | 3/2021 |
| CN | 113052768 A | 6/2021 |
| CN | 113052814 A | 6/2021 |
| CN | 113822812 A | 12/2021 |

OTHER PUBLICATIONS

G. Prabhu Teja and S. Ravi, "Face recognition using subspaces techniques," 2012 International Conference on Recent Trends in Information Technology, Chennai, India, 2012, pp. 103-107, doi: 10.1109/ICRTIT.2012.6206780. (Year: 2012).*

W. Wang, X. Wu, X. Yuan and Z. Gao, "An Experiment-Based Review of Low-Light Image Enhancement Methods," in IEEE Access, vol. 8, pp. 87884-87917, 2020, doi: 10.1109/Access.2020.2992749. (Year: 2020).*

Guo, Shi, "Research on Real-World Camera Photographs Denoising Based on Convolutional Neural Network," Dissertation for the Master Degree in Engineering, Harbin Institute of Technology, School of Computer Science and Technology, Jun. 2019, 60 pages.

Somasundaran, B.V. et al., "Image Denoising for Image Retrieval by Cascading a Deep Quality Assessment Network," 2018 25th IEEE International Conference on Image Processing (ICIP), Athens, Greece, 2018, pp. 525-529.

* cited by examiner

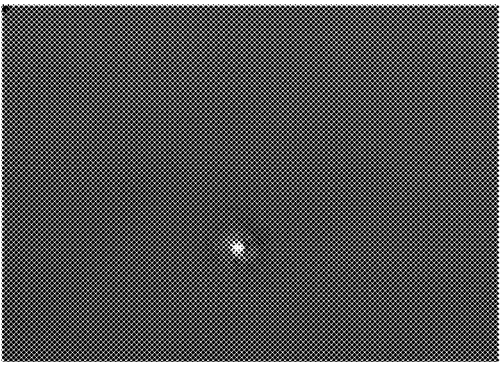

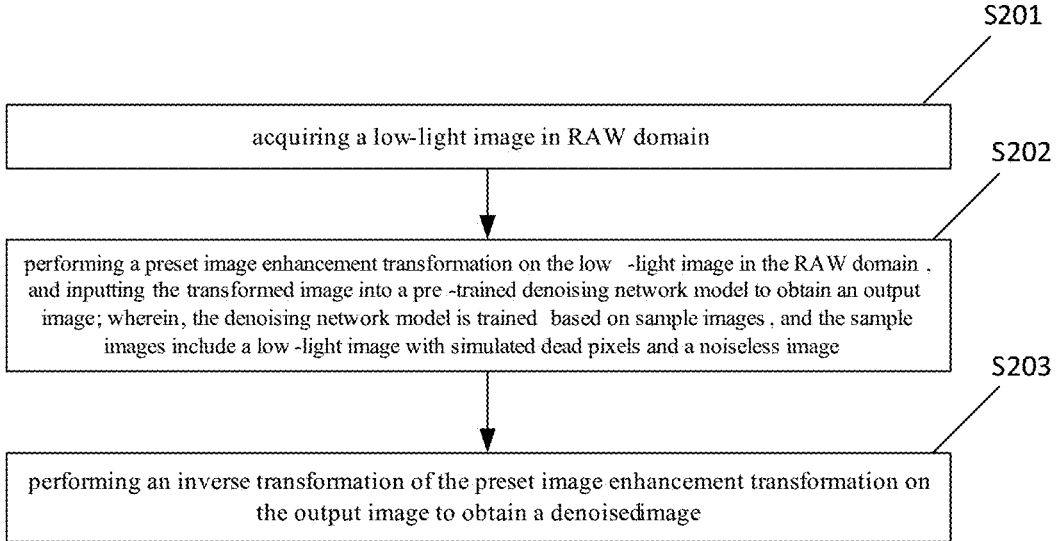

acquiring a low-light image in RAW domain

S202 performing a preset image enhancement transformation on the low -light image in the RAW domain , and inputting the transformed image into a pre -trained denoising network model to obtain an output image; wherein, the denoising network model is trained based on sample images , and the sample images include a low -light image with simulated dead pixels and a noiseless image

S203 performing an inverse transformation of the preset image enhancement transformation on the output image to obtain a denoisedimage

FIG. 2

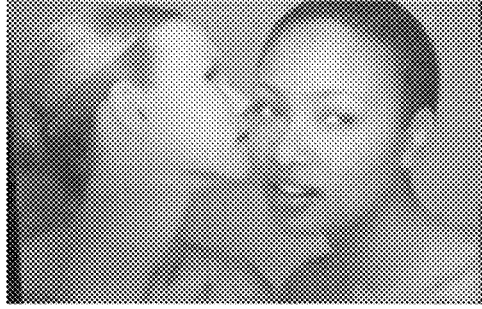

FIG. 3A

METHOD AND APPARATUS FOR DENOISING A LOW-LIGHT IMAGE

The present application claims the priority to a Chinese patent application No. 202111641889.8 filed with the China National Intellectual Property Administration on Dec. 29, 2021 and entitled "method and apparatus for denoising a low-light image", which is incorporated herein by reference in its entirety.

TECHNICAL FIELD

The invention relate to the technical field of image processing, in particular to a method and an apparatus for denoising a low-light image.

BACKGROUND

With the rapid development of computer vision technology and optical imaging technology, the way of acquiring an image or video by using a video image acquisition device and processing the image and video has been widely used in security, coastal defense, intelligent transportation and other aspects.

However, when an imaging device is in a low illumination condition, a captured image will contain a lot of noise due to the serious lack of light, making the image unclear and quality poor, which will reduce the accuracy of subsequent image processing results. Therefore, such images need to be denoised before analysis and processing, however, in the process of denoising, dead pixels present in the image will seriously affect the quality of image denoising.

An imaging element of the imaging device is usually CCD (Charge-coupled Device) or CMOS (Complementary Metal-Oxide-Semiconductor), which contains millions of photosensitive units. If a certain photosensitive unit is damaged, it will become a dead pixel, and a pixel value of a pixel position corresponding to the dead pixel in the image will be obviously different from the surrounding pixels. For the low-light image, the dead pixel is usually a highlighted dead pixel.

In RAW domain denoising technology of the low-light image based on deep learning, the pixel value of the image itself is relatively small, and the influence of highlighted dead pixels in input data, after being amplified by a receptive-field (RF) mechanism of convolutional neural network, will spread from a single pixel to several pixels or even dozens of pixels, which seriously reduces the visual quality of the image. Referring to FIG. 1, which is a schematic diagram of the influence of dead pixels in a low-light image in RAW domain after denoising by the techniques readily understood by one of ordinary skill in the art, there is one highlighted dead pixel in an original low-light image before denoising. As shown in FIG. 1, after denoising, the dead pixel has affected a plurality of surrounding pixels.

Although many Image Signal Processing (ISP) algorithms include the correction of dead pixels, traditional image processing methods can not completely eliminate dead pixels due to the diversity and complexity of the dead pixels, and removing dead pixels is of great intensity, which will lead to a smooth effect similar to median filtering occurred in the image and damage edge details of the image.

SUMMARY

The objects of examples of the present disclosure are to provide a method and apparatus for denoising a low-light image, so as to significantly reduce the influence of dead pixels of the image on a process of denoising the low-light image and improve the quality of denoising the low-light image. The specific technical solutions are as follows.

The present disclosure provides a method for denoising a low-light image, including:

acquiring a low-light image in RAW domain;

performing a preset image enhancement transformation on the low-light image in the RAW domain, and inputting the transformed image into a pre-trained denoising network model to obtain an output image;

wherein, the denoising network model is trained based on sample images, and the sample images include a low-light image with simulated dead pixels and a noiseless image;

performing an inverse transformation of the preset image enhancement transformation on the output image to obtain a denoised image.

Optionally, performing the preset image enhancement transformation on the low-light image in the RAW domain includes:

sequentially performing normalization and gamma transformation on the low-light image in the RAW domain.

Optionally, the denoising network model is trained by operations of:

acquiring an initial neural network model and the sample images;

inputting a low-light image with simulated dead pixels subjected to the preset image enhancement transformation into the initial neural network model;

computing a loss value based on an output result of the initial neural network model and a noiseless image subjected to the preset image enhancement transformation;

adjusting a model parameter of the initial neural network based on the loss value, and returning to the operation of inputting a low-light image with simulated dead pixels subjected to the preset image enhancement transformation into the initial neural network model, until the initial neural network model converges;

determining the converged initial neural network model as the denoising network model.

Optionally, the low-light image with simulated dead pixels is obtained by operations of:

acquiring a low-light noise image;

randomly generating a certain number of dead pixels in the low-light noise image based on a pre-determined proportion of dead pixels of a sensor to obtain the low-light image with simulated dead pixels, wherein pixel values of the generated dead pixels are highlighted values, or pixel values of the generated dead pixels and pixel values of surrounding pixels of the generated dead pixels do not meet a preset distribution.

An example of the present disclosure also provides an apparatus for denoising a low-light image, including:

an acquisition module configured to acquire a low-light image in the RAW domain;

a denoising module configured to perform a preset image enhancement transformation on the low-light image in the RAW domain, and input the transformed image into a pre-trained denoising network model to obtain an output image; wherein, the denoising network model is trained based on sample images, and the sample images comprise a low-light image with simulated dead pixels and a noiseless image;

an inverse transformation module configured to perform an inverse transformation of the preset image enhancement transformation on the output image to obtain a denoised image.

Optionally, the denoising module includes an enhancement transformation sub-module, and the enhancement transformation sub-module is specifically configured to:

sequentially perform normalization and gamma transformation on the low-light image in the RAW domain.

Optionally, the apparatus also includes a training module, wherein the training module is specifically configured to:

acquire an initial neural network model and the sample images;

input a low-light image with simulated dead pixels subjected to the preset image enhancement transformation into the initial neural network model;

compute a loss value based on an output result of the initial neural network model and a noiseless image subjected to the preset image enhancement transformation;

adjust a model parameter of the initial neural network based on the loss value, and return to the operation of inputting a low-light image with simulated dead pixels subjected to the preset image enhancement transformation into the initial neural network model, until the initial neural network model converges;

determine the converged initial neural network model as the denoising network model.

Optionally, the apparatus also includes a generating module configured to:

acquire a low-light noise image;

randomly generate a certain number of dead pixels in the low-light noise image based on a pre-determined proportion of dead pixels of a sensor to obtain the low-light image with simulated dead pixels, wherein pixel values of the generated dead pixels are highlighted values, or pixel values of the generated dead pixels and pixel values of surrounding pixels of the generated dead pixels do not meet a preset distribution.

An example of the present disclosure also provides an electronic device, including a processor, a communication interface, a memory and a communication bus, wherein the processor, the communication interface and the memory communicate with each other through the communication bus;

the memory is configured to store computer programs;

the processor is configured to execute the programs stored in the memory to carry out steps of any method for denoising a low-light image above.

An example of the present disclosure also provides a computer-readable storage medium having stored therein computer programs which when executed by a processor, carry out steps of any method for denoising a low-light image above.

The method and apparatus for denoising a low-light image provided by examples of the present disclosure are applied to acquire a low-light image in the RAW domain; perform a preset image enhancement transformation on the low-light image in the RAW domain, and input the transformed image into a pre-trained denoising network model to obtain an output image, wherein, the denoising network model is trained based on sample images, and the sample images include a low-light image with simulated dead pixels and a noiseless image; perform an inverse transformation of the preset image enhancement transformation on the output image to obtain a denoised image.

It can be seen that the low-light image with simulated dead pixels is generated by simulating the distribution of dead pixels, and the denoising network model is trained by the low-light image with simulated dead pixels in combination with the noiseless image. After the training is completed, the denoising network model can denoise the input image in the RAW domain and automatically suppress the dead pixels. That is, the influence of dead pixels in the image on image denoising is greatly reduced, and the quality of image denoising is improved. In addition, since the denoising network model can automatically suppress the dead pixels during image denoising, there is no need to specifically correct the dead pixels, thus avoiding losing edge details of the image during correcting the dead pixels.

Moreover, by performing the image enhancement transformation on the low-light image in the RAW domain before the low-light image in the RAW domain is input into the network model, the maximum dead pixels can be effectively suppressed and the dark details of the image can be enhanced, which is more conducive to denoising in a subsequent network model and further improves the quality of image denoising.

Of course, it is not necessary for any product or method of the present disclosure to achieve all the advantages described above at the same time.

BRIEF DESCRIPTION OF THE DRAWINGS

The accompanying drawings described herein are provided to provide a further understanding of the present disclosure and constitute a part of the present disclosure. The illustrative embodiments of the present disclosure and their descriptions are used to explain the present disclosure and do not constitute undue limitations on the present disclosure.

FIG. 1 is a schematic diagram of the influence of dead pixels in a low-light image in RAW domain after denoising by using the techniques readily understood by one of ordinary skill in the art;

FIG. 2 is a schematic flow diagram of a method for denoising a low-light image provided by an example of the present disclosure;

FIG. 3A is a schematic diagram of a result of denoising in the techniques readily understood by one of ordinary skill in the art;

DETAILED DESCRIPTION

Figure 3B:
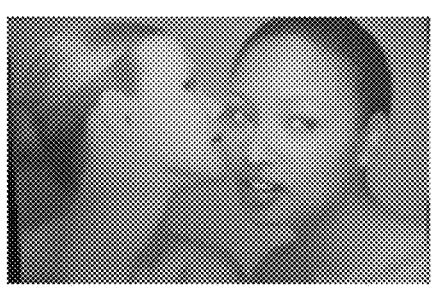
FIG. 3B is a schematic diagram of a result of denoising by using the method for denoising a low-light image provided by an example of the present disclosure.

In order to make the objective, technical solutions and advantages of the disclosure clearer and more understandable, the present disclosure will be described in more detail below with reference to the accompanying drawings and examples. Obviously, the described examples are only some, and not all, of the examples of the disclosure. All other examples obtained based on the examples of the disclosure by those skilled in the art without any creative efforts fall into the scope of protection of the disclosure.

In order to reduce the influence of dead pixels of an image on a process of denoising a low-light image and improve the quality of denoising a low-light image, examples of the present disclosure provide a method and apparatus for denoising a low-light image. The method can be applied to an electronic device. For example, the electronic device can be a device with an image processing capability, such as a desktop computer, a server, a tablet computer and a mobile phone.

Referring to FIG. 2, FIG. 2 is a schematic flow diagram of a method for denoising a low-light image provided by an example of the present disclosure. As shown in FIG. 2, the method includes following steps:

S201: acquiring a low-light image in the RAW domain.

The method for denoising a low-light image provided by an example of the present disclosure aims at the low-light image in the RAW domain. In this step, the low-light image in the RAW domain that needs to be denoised is acquired.

An image captured by an imaging device in a low illumination condition is a low-light image. Due to the serious lack of light, the captured image contains a lot of noise, making the image unclear and quality poor, thus the image needs to be denoised.

Those skilled in the art can understand that an image output by a sensor is the image in the RAW domain (also called an original image file). After performing ISP processing for the image in the RAW domain, noise properties of the image will become more complicated and difficult to process. Therefore, denoising is usually carried out before ISP processing. That is, denoising is directly performed for the image in the RAW domain.

To sum up, when the imaging device captures an image in a low illumination condition, an image directly output by a sensor of the imaging device is the low-light image in the RAW domain. The low illumination condition refers to the insufficient light in a shooting environment, that is, the insufficient light input of the imaging device.

S202: performing a preset image enhancement transformation on the low-light image in the RAW domain, and inputting the transformed image into a pre-trained denoising network model to obtain an output image; wherein, the denoising network model is trained based on sample images, and the sample images include a low-light image with simulated dead pixels and a noiseless image.

In an example of the present disclosure, deep learning is adopted to train the neural network model, so as to realize automatic dead pixel suppression during the denoising.

In order to enhance dark details of the low-light image in the RAW domain, a preset image enhancement transformation is performed before the low-light image in the RAW domain is input into the pre-trained denoising network model.

The image enhancement transformation can include image normalization and gamma transformation. The image normalization can reduce the influence of highlights in the low-light image in the RAW domain, and facilitate the subsequent gamma transformation. The gamma transform can compress a part with high gray level and stretch a part with low gray level in the image, thus enhancing the dark details.

After the preset image enhancement transformation, the image is input into the denoising network model. Because the denoising network model is pre-trained based on the sample images, the image can be denoised to obtain the output image.

The sample images used to train the denoising network model include a large number of low-light images simulating dead pixels and noiseless images. The low-light images simulating dead pixels and noiseless images can be in one-to-one correspondence. For example, the sample images contain 1000 low-light images simulating dead pixels and 1000 noiseless images, and each low-light image with simulated dead pixels corresponds to one noiseless image. The low-light image with simulated dead pixels and noiseless image corresponding to each other have the same image contents, but have different image qualities.

The noiseless image in the sample images can be understood as an ideal image, which contains neither noise nor dead pixels. The low-light image with simulated dead pixels contains noise and dead pixels.

In one example of the present disclosure, the low-light image with simulated dead pixels is obtained by operations of:

acquiring a low-light noise image; randomly generating a certain number of dead pixels in the low-light noise image based on a pre-determined proportion of dead pixels of a sensor to obtain the low-light image with simulated dead pixels, wherein pixel values of the generated dead pixels are highlighted values, or pixel values of the generated dead pixels and pixel values of surrounding pixels of the generated dead pixels do not meet a preset distribution.

Specifically, in the process of simulating noise image, the low-light noise image, i.e., the low-light image containing noise, is obtained, and then a certain number of dead pixels with random positions are randomly generated according to a proportion of dead pixels of a CMOS or CCD sensor obtained by statistics.

For example, the number of dead pixels in an image with 1080p resolution usually ranges from several hundred to several thousand, and the number of dead pixels is related to the sensor technology. Then, in an example of the present disclosure, some pixel coordinates can be randomly determined on the low-light image in the RAW domain containing noise. Pixel values at these positions are set as abnormal values or pixel values that obviously do not meet Poisson distribution and Gaussian distribution, so as to simulate a distribution of dead pixels and generate the low-light image with simulated dead pixels.

Since in an example of the present disclosure, the low-light image with simulated dead pixels and the noiseless image in the sample images can be in one-to-one correspondence, the noiseless image can be obtained and processed to obtain the low-light noise image firstly, and then the dead pixels are generated on the low-light noise image, so that the low-light image with simulated dead pixels corresponding to each noiseless image can be obtained.

As an example, under normal brightness, the ISO value (sensitivity) of the imaging device is adjusted to the lowest for shooting, so as to obtain a noiseless RAW image. Then, pixel values of pixels in the noiseless image are divided by different ratios, such as 10, 100 and 200, to obtain low-light noiseless images with different levels, i.e., noiseless images in the sample images. After obtaining the low-light noiseless images, noise is added to the low-light noiseless images based on physical imaging modeling, to obtain the low-light noise images corresponding to the low-light noiseless images one by one. Since information of dead pixels in the low-light noise images obtained in this way is insufficient, it is necessary to generate dead pixels in each low-light noise image, so as to obtain the low-light images simulating dead pixels corresponding to the noiseless images one by one.

In an example of the present disclosure, the denoising network model is pre-trained by using the low-light image with simulated dead pixels and noiseless image. The trained denoising network model can denoise the input RAW image.

In this step, the transformed image is input into the denoising network model to obtain the output image.

S203: performing an inverse transformation of the preset image enhancement transformation on the output image to obtain a denoised image.

After obtaining the image output by the denoising network model, the inverse transformation of the preset image enhancement transformation can be performed to obtain the denoised image in the RAW domain.

Since the preset image enhancement transformation sequentially includes normalization and gamma transformation, the inverse transformation can sequentially include inverse gamma transformation and inverse normalization transformation.

The method for denoising a low-light image provided by an example of the present disclosure is applied to obtain a low-light image in the RAW domain; perform a preset image enhancement transformation on the low-light image in the RAW domain, and input the transformed image into a pre-trained denoising network model to obtain an output image, wherein, the denoising network model is trained based on sample images, and the sample images include a low-light image with simulated dead pixels and a noiseless image; perform an inverse transformation of the preset image enhancement transformation on the output image to obtain a denoised image.

It can be seen that the low-light image with simulated dead pixels is generated by simulating the distribution of dead pixels, and the denoising network model is trained by the low-light image with simulated dead pixels in combination with the noiseless image. After the training is completed, the denoising network model can denoise the input image in the RAW domain and automatically suppress the dead pixels. That is, the influence of dead pixels in the image on image denoising is greatly reduced, and the quality of image denoising is improved. In addition, since the denoising network model can automatically suppress the dead pixels during image denoising, there is no need to specifically correct the dead pixels, thus avoiding losing edge details of the image during correcting the dead pixels.

Moreover, by performing the image enhancement transformation before the low-light image in the RAW domain is input into the network model, the maximum dead pixels can be effectively suppressed and the dark details of the image can be enhanced, which is more conducive to denoising in a subsequent network model and further improves the quality of image denoising.

As an example, refer to FIG. 3A and FIG. 3B. An original image corresponding to FIG. 3A is the same as that corresponding to FIG. 3B, and both original images come from public data sets. FIG. 3A is a schematic diagram of a result of denoising in the techniques readily understood by one of ordinary skill in the art, and FIG. 3B is a schematic diagram of a result of denoising by using the method for denoising a low-light image provided by an example of the present disclosure.

It can be seen that in FIG. 3A, the influence of dead pixels cannot be eliminated, resulting in that the image contains more pixels with abnormal pixel values. The image thus looks blurred, that is, the quality of image denoising is poor.

FIG. 3B utilizes the method for denoising a low-light image provided by an example of the present disclosure, which can basically eliminate the influence of dead pixels on image denoising, so the image basically does not contain pixels with abnormal pixel values, and the whole image is cleaner and clearer.

The process of training the denoising network model is introduced below. Specific training steps can include:

Step 11: acquiring an initial neural network model and the sample images.

Specifically, the initial neural network model can be a convolutional neural network model, and a structure of the network model can be an encoder-decoder structure.

Figure 4:
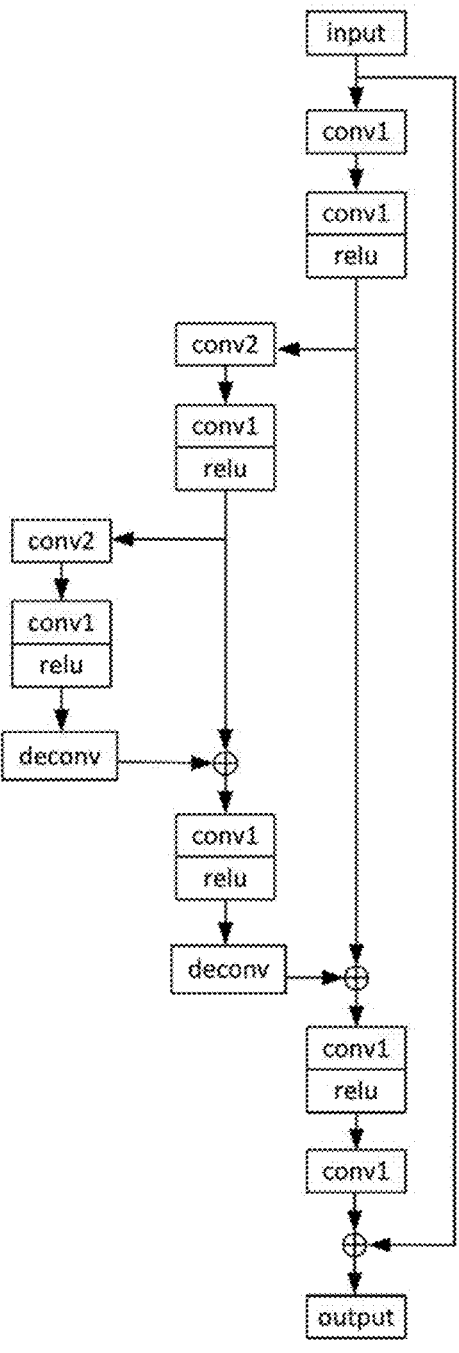
FIG. 4 is a schematic structure diagram of a denoising network model provided by an example of the present disclosure.

As an example, refer to FIG. 4, which is a schematic structure diagram of the denoising network model provided by an example of the present disclosure. In FIG. 4, input represents an input image and output represents an output image; conv1 represents a first convolution structure, with kernel size=3×3 and stride=1; conv2 represents a second convolution structure, with convolution kernel=2×2 and stride=2; deconv represents a transposed convolution structure, with kernel size=2×2 and stride=2; relu represents a linear rectification function.

The sample images include a large number of low-light images simulating dead pixels and noiseless images corresponding to each other. Please refer to the related introduction in step S202 for details.

Step 12: inputting a low-light image with simulated dead pixels subjected to the preset image enhancement transformation into the initial neural network model; computing a loss value based on an output result of the initial neural network model and a noiseless image subjected to the preset image enhancement transformation.

In an example of the present disclosure, the preset image enhancement transformation can be performed on the low-light image with simulated dead pixels and the noiseless image respectively. The preset image enhancement transformation includes normalization and gamma transformation.

Taking the preset image enhancement transformation processing on the low-light image with simulated dead pixels as an example, the low-light image with simulated dead pixels is set to I, (i, j) is pixel coordinates, and a pixel value of a pixel with coordinates (i, j) is set to $x_{ij}$.

A maximum brightness of pixels in the low-light image with simulated dead pixels is set to max_b, and then pixel $x_{ij}$ in the low-light image with simulated dead pixels are normalized to obtain $x'_{ij}$.

It can be expressed as:

$$x'_{ij} = \frac{x_{ij}}{\max\_b}$$

In general, a storage space occupied by pixels is 10 bits, so max_b=1023; if a storage space occupied by pixels is 12 bits, max_b=4095.

Normalization can significantly reduce the influence of the highlighted part in the RAW domain. A normalized image is represented by I', and then the gamma transformation is performed on the normalized image.

As an example, the gamma transformation is performed on the pixel $x'_{ij}$ in I' to obtain $x''_{ij}$, where the gamma coefficient can be set according to requirements. When the gamma coefficient is 1/2.2, the above transformation can be expressed as:

$$x''_{ij} = x'^{\frac{1}{2.2}}_{ij}$$

Gamma transformation with coefficient less than 1 can compress the part with high gray level in the image and stretch the part with low gray level, thus enhancing the dark details of the low-light image.

The low-light image with simulated dead pixels subjected to the preset image enhancement transformation is input into the initial neural network model to obtain the output result of the initial neural network model, and then the loss value can be computed by combining the output result and the noiseless image subjected to the preset image enhancement transformation.

It can be expressed as:

$$\hat{y} = f(x)$$

$$\text{loss} = |y - \hat{y}|$$

Where x is the low-light image with simulated dead pixels subjected to the image enhancement transformation, y is the noiseless image subjected to the image enhancement transformation, $f$ is a fitting function relation of the network model, $\hat{y}$ is a result output by the neural network model, and an absolute value of a difference between y and $\hat{y}$ can be taken as the loss value.

As an example, each of absolute values of differences between pixel values of pixels with corresponding positions in y and $\hat{y}$ is computed, and then average the absolute values to obtain the loss value.

Step 13: adjusting a model parameter of the initial neural network based on the loss value, and returning to the operation of inputting a low-light image with simulated dead pixels subjected to the preset image enhancement transformation into the initial neural network model, until the initial neural network model converges.

The model parameter is adjusted by using a back propagation method according to the loss value, and a round of training is completed.

Then return to step 12 for the next round of training. After repeated iterative training, stable model parameters can be obtained. At this time, the initial neural network model can be regarded as convergent.

Step 14: determining the converged initial neural network model as the denoising network model.

It can be seen that in an example of the present disclosure, the low-light image with simulated dead pixels is generated by simulating the distribution of dead pixels, and the denoising network model is trained by the low-light image with simulated dead pixels in combination with the noiseless image. During the training, the parameters of the network model are constantly adjusted, so that the network model can process the input image, and a result of the processing are constantly close to the noiseless image, thus realizing image denoising. Moreover, since the input image is the low-light image with simulated dead pixels, the trained denoising network model can be well applied to the denoising of low-light image with dead pixels. That is, the influence of dead pixels on image denoising is automatically suppressed and the quality of image denoising is improved.

Figure 5:
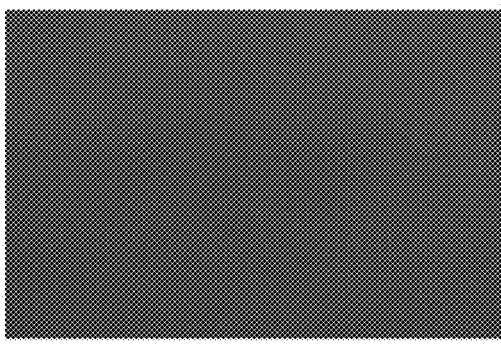
FIG. 5 is a schematic diagram of the influence of dead pixels in the low-light image in the RAW domain after being processed by the method for denoising a low-light image provided by an example of the present disclosure.

As an example, refer to FIG. 5, which is a schematic diagram of the influence of dead pixels in the low-light image in the RAW domain after being processed by the method for denoising a low-light image provided by an example of the present disclosure.

There is a highlighted dead pixel in an original low-light image before denoising corresponding to FIG. 5. After the original low-light image is processed by the method for denoising a low-light image provided by an example of the present disclosure, the highlighted dead pixel can no longer be seen. It can be seen that the highlighted dead pixel in the low-light image is obviously suppressed after processed by the method for denoising a low-light image provided by an example of the present disclosure. The highlighted dead pixel no longer spreads to several or even dozens of pixels as shown in FIG. 1.

Figure 6:
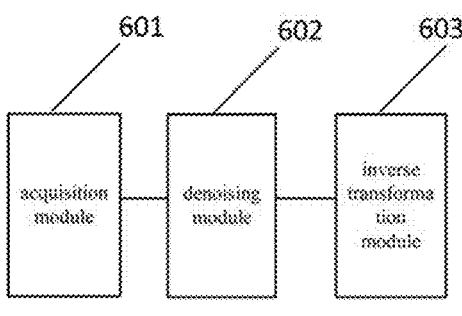
FIG. 6 is a schematic structure diagram of an apparatus for denoising the low-light image provided by an example of the present disclosure.

Referring to FIG. 6, FIG. 6 is a schematic structure diagram of an apparatus for denoising the low-light image provided by an example of the present disclosure. As shown in FIG. 6, the apparatus can include:

an acquisition module 601 configured to acquire a low-light image in the RAW domain;

a denoising module 602 configured to perform a preset image enhancement transformation on the low-light image in the RAW domain, and input the transformed image into a pre-trained denoising network model to obtain an output image; wherein, the denoising network model is trained based on sample images, and the sample images include a low-light image with simulated dead pixels and a noiseless image;

an inverse transformation module 603 configured to perform an inverse transformation of the preset image enhancement transformation on the output image to obtain a denoised image.

In an example of the present disclosure, the denoising module 602 includes an enhancement transformation sub-module, and the enhancement transformation sub-module is specifically configured to:

sequentially perform normalization and gamma transformation on the low-light image in the RAW domain.

In an example of the present disclosure, the apparatus shown in FIG. 6 can further include a training module, wherein the training module is specifically configured to:

acquire an initial neural network model and the sample images;

input a low-light image with simulated dead pixels subjected to the preset image enhancement transformation into the initial neural network model;

compute a loss value based on an output result of the initial neural network model and a noiseless image subjected to the preset image enhancement transformation;

adjust a model parameter of the initial neural network based on the loss value, and return to the operation of inputting a low-light image with simulated dead pixels subjected to the preset image enhancement transformation into the initial neural network model, until the initial neural network model converges;

determine the converged initial neural network model as the denoising network model.

In an example of the present disclosure, the apparatus shown in FIG. 6 can further include a generating module, which is specifically configured to:

acquire a low-light noise image;

randomly generate a certain number of dead pixels in the low-light noise image based on a pre-determined proportion of dead pixels of a sensor to obtain the low-light image with simulated dead pixels, wherein pixel values of the generated dead pixels are highlighted values, or pixel values of the generated dead pixels and pixel values of surrounding pixels of the generated dead pixels do not meet a preset distribution.

The apparatus for denoising a low-light image provided by an example of the present disclosure is applied to acquire a low-light image in the RAW domain; perform a preset image enhancement transformation on the low-light image in the RAW domain, and input the transformed image into a pre-trained denoising network model to obtain an output image, wherein, the denoising network model is trained based on sample images, and the sample images include a low-light image with simulated dead pixels and a noiseless image; perform an inverse transformation of the preset image enhancement transformation on the output image to obtain a denoised image.

It can be seen that the low-light image with simulated dead pixels is generated by simulating the distribution of dead pixels, and the denoising network model is trained by the low-light image with simulated dead pixels in combination with the noiseless image. After the training is completed, the denoising network model can denoise the input image in the RAW domain and automatically suppress the dead pixels. That is, the influence of dead pixels in the image on image denoising is greatly reduced, and the quality of image denoising is improved. In addition, since the denoising network model can automatically suppress the dead pixels during image denoising, there is no need to specifically correct the dead pixels, thus avoiding losing edge details of the image during correcting the dead pixels.

Moreover, by performing the image enhancement transformation on the low-light image in the RAW domain before the low-light image in the RAW domain is input into the network model, the maximum dead pixels can be effectively suppressed and the dark details of the image can be enhanced, which is more conducive to denoising in a subsequent network model and further improves the quality of image denoising.

Figure 7:
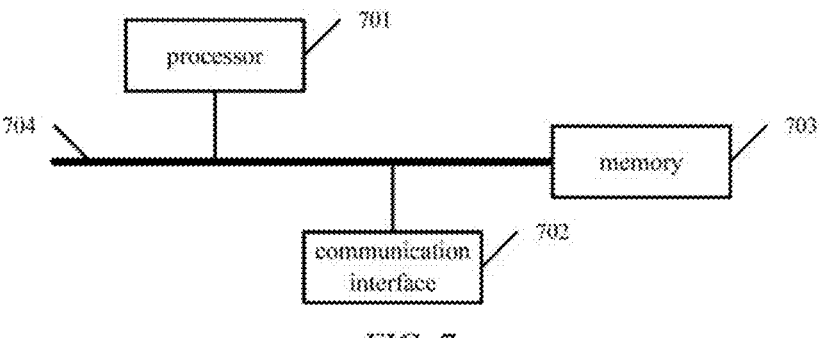
FIG. 7 is a schematic structure diagram of an electronic device provided by an example of the present disclosure.

An example of the present disclosure also provides an electronic device as shown in FIG. 7, which includes a processor 701, a communication interface 702, a memory 703 and a communication bus 704, wherein the processor 701, the communication interface 702 and the memory 703 communicate with each other through the communication bus 704.

The memory 703 is configured to store computer programs;

The processor 701 is configured to execute the programs stored in the memory 703 to implement the following steps:

acquiring a low-light image in the RAW domain;

performing a preset image enhancement transformation on the low-light image in the RAW domain, and inputting the transformed image into a pre-trained denoising network model to obtain an output image; wherein, the denoising network model is trained based on sample images, and the sample images include a low-light image with simulated dead pixels and a noiseless image;

performing an inverse transformation of the preset image enhancement transformation on the output image to obtain a denoised image.

The communication bus mentioned for the electronic device can be a Peripheral Component Interconnect (PCI) bus or an Extended Industry Standard Architecture (EISA) bus. The communication bus can be divided into address bus, data bus and control bus. For the convenience of representation, the communication bus is represented only by a thick line, but it does not mean that there is only one bus or one type of bus.

The communication interface is used for communication between the electronic device and other devices.

The memory may include Random Access Memory (RAM) or Non-Volatile Memory (NVM), such as at least one disk memory. Alternatively, the memory can also be at least one storage device located far away from the processor.

The processor can be a general processor, including a Central Processing Unit (CPU) and a Network Processor (NP) and so on. The processor can also be a Digital Signal Processor (DSP), an Application Specific Integrated Circuit (ASIC), a Field-Programmable Gate Array (FPGA) or other programmable logic devices, discrete gate or transistor logic devices, and discrete hardware components.

The electronic device provided by an example of the present disclosure is applied to acquire a low-light image in the RAW domain; perform a preset image enhancement transformation on the low-light image in the RAW domain, and input the transformed image into a pre-trained denoising network model to obtain an output image, wherein, the denoising network model is trained based on sample images, and the sample images include a low-light image with simulated dead pixels and a noiseless image; perform an inverse transformation of the preset image enhancement transformation on the output image to obtain a denoised image.

It can be seen that the low-light image with simulated dead pixels is generated by simulating the distribution of dead pixels, and the denoising network model is trained by the low-light image with simulated dead pixels in combination with the noiseless image. After the training is completed, the denoising network model can denoise the input image in the RAW domain and automatically suppress the dead pixels. That is, the influence of dead pixels in the image on image denoising is greatly reduced, and the quality of image denoising is improved. In addition, since the denoising network model can automatically suppress the dead pixels during image denoising, there is no need to specifically correct the dead pixels, thus avoiding losing edge details of the image during correcting the dead pixels.

Moreover, by performing the image enhancement transformation on the low-light image in the RAW domain before the low-light image in the RAW domain is input into the network model, the maximum dead pixels can be effectively suppressed and the dark details of the image can be enhanced, which is more conducive to denoising in a subsequent network model and further improves the quality of image denoising.

In another example provided by the present disclosure, it is provided a computer-readable storage medium having stored therein computer programs which when executed by a processor, cause the processor to implement steps of any method for denoising a low-light image above.

In yet another example provided by the present disclosure, there is also provided a computer program product containing instructions, which, when run on a computer, cause the computer to perform any method for denoising a low-light image in above examples.

The above examples may be implemented in whole or in part by software, hardware, firmware or any combination thereof. When implemented in software, it can be implemented in whole or in part in the form of a computer procedure product. The computer procedure product includes one or more computer instructions. When the computer procedure instructions are loaded and executed on a computer, the processes or functions described in the examples of the present disclosure are generated in whole or in part. The computer may be a general purpose computer, special purpose computer, computer network, or other pro-
grammable device. The computer instructions may be stored
in a computer readable storage medium or transmitted from
one computer readable storage medium to another computer
readable storage medium, for example, the computer
instructions may be transmitted from a website, computer,
server or data center to another website, computer, server, or
data center by wire (such as coaxial cable, fiber optic, digital
subscriber line (DSL)) or wirelessly (such as infrared, wire-
less, microwave, etc.). The computer-readable storage
medium may be any usable medium that can be accessed by
a computer or a data storage device such as a server and a
data center and the like that includes an integration of one or
more available media. The usable media may be magnetic
media (such as a floppy disk, a hard disk, a magnetic tape),
optical media (such as DVD), or semiconductor media (such
as Solid State Disk (SSD)) and the like.

It should be noted that, relational terms such as first and
second and the like herein are only used to distinguish one
entity or operation from another and do not necessarily
require or imply any such actual relationship or order
between these entities or operations. Moreover, the terms
"comprising", "including" or any other variations thereof
are intended to encompass a non-exclusive inclusion such
that a process, method, article or device that includes a series
of elements includes not only those elements, but also
includes other elements not explicitly listed or other ele-
ments inherent to such a process, method, article or appa-
ratus. Without further limitation, elements defined by the
phrase "comprising one . . . " do not preclude the presence
of additional identical elements in a process, method, article
or device that includes the mentioned elements.

The various examples in this specification are described in
a related manner. Each example focuses on the differences
from other examples, and the same and similar parts
between the various examples can be referred to each other.
Especially, for the example of the apparatus for denoising a
low-light image, the electric device, the computer-readable
storage medium and the computer program product, the
description is relatively simple because it is basically similar
to the example of the method for denoising a low-light
image, and the relevant points can be referred to the partial
description of the example of the method.

The above descriptions are only preferred examples of the
disclosure, and are not intended to limit the disclosure. Any
modifications, equivalent replacements, improvements and
the like made within the spirit and principles of the disclo-
sure shall be included within the scope of protection of the
disclosure.

The invention claimed is:

1. A method for denoising a low-light image, wherein the
low-light image contains noise and dead pixels, comprising:
　acquiring a low-light image in RAW domain;
　performing a preset image enhancement transformation
　　on the low-light image in the RAW domain, and
　　inputting the transformed image into a pre-trained
　　denoising network model to obtain an output image;
　　wherein, the denoising network model is trained based
　　on sample images, and the sample images comprise a
　　low-light image with simulated dead pixels and a
　　noiseless image;
　performing an inverse transformation of the preset image
　　enhancement transformation on the output image to
　　obtain a denoised image;
　wherein performing the preset image enhancement trans-
　　formation on the low-light image in the RAW domain
　　comprises:

sequentially performing normalization and gamma trans-
　formation on the low-light image in the RAW domain;
　wherein the normalization is performed by a formula:

$$x'_{ij} = \frac{x_{ij}}{\max\_b}$$

wherein $x_{ij}$ denotes a pixel value of a pixel with coordi-
　nates (i, j) in the low-light image in the RAW domain,
　max_b denotes a maximum brightness of pixels in the
　low-light image in the RAW domain, $x'_{ij}$ denotes a pixel
　value of the pixel with coordinates (i, j) in the normal-
　ized low-light image in the RAW domain;
wherein the inverse transformation sequentially includes
　inverse gamma transformation and inverse normaliza-
　tion transformation;
wherein the noiseless image is obtained by: adjusting an
　ISO value of an imaging device to lowest for shooting,
　so as to obtain a noiseless RAW image: dividing pixel
　values of pixels in the noiseless RAW image by dif-
　ferent ratios, to obtain low-light noiseless images with
　different levels, which are determined as noiseless
　images in the sample images.

2. The method according to claim 1, wherein the denois-
ing network model is trained by operations of:
　acquiring an initial neural network model and the sample
　　images;
　inputting a low-light image with simulated dead pixels
　　subjected to the preset image enhancement transforma-
　　tion into the initial neural network model;
　computing a loss value based on an output result of the
　　initial neural network model and a noiseless image
　　subjected to the preset image enhancement transforma-
　　tion;
　adjusting a model parameter of the initial neural network
　　based on the loss value, and returning to the operation
　　of inputting a low-light image with simulated dead
　　pixels subjected to the preset image enhancement trans-
　　formation into the initial neural network model, until
　　the initial neural network model converges;
　determining the converged initial neural network model
　　as the denoising network model.

3. The method according to claim 1, wherein the low-light
image with simulated dead pixels is obtained by operations
of:
　acquiring a low-light noise image;
　randomly generating a certain number of dead pixels in
　　the low-light noise image based on a pre-determined
　　proportion of dead pixels of a sensor to obtain the
　　low-light image with simulated dead pixels, wherein
　　pixel values of the generated dead pixels are high-
　　lighted values, or pixel values of the generated dead
　　pixels and pixel values of surrounding pixels of the
　　generated dead pixels do not meet a preset distribution.

4. An apparatus for denoising a low-light image, wherein
the low-light image contains noise and dead pixels, com-
prising:
　an acquisition module configured to acquire a low-light
　　image in RAW domain;
　a denoising module configured to perform a preset image
　　enhancement transformation on the low-light image in
　　the RAW domain, and input the transformed image into
　　a pre-trained denoising network model to obtain an
　　output image; wherein, the denoising network model is trained based on sample images, and the sample images comprise a low-light image with simulated dead pixels and a noiseless image;

an inverse transformation module configured to perform an inverse transformation of the preset image enhancement transformation on the output image to obtain a denoised image;

wherein the denoising module comprises an enhancement transformation sub-module, and the enhancement transformation sub-module is specifically configured to:

sequentially perform normalization and gamma transformation on the low-light image in the RAW domain;

wherein the normalization is performed by a formula:

$$x'_{ij} = \frac{x_{ij}}{\max\_b}$$

wherein $x_{ij}$ denotes a pixel value of a pixel with coordinates (i, j) in the low-light image in the RAW domain, max_b denotes a maximum brightness of pixels in the low-light image in the RAW domain, $x'_{ij}$ denotes a pixel value of the pixel with coordinates (i, j) in the normalized low-light image in the RAW domain;

wherein the inverse transformation sequentially includes inverse gamma transformation and inverse normalization transformation;

wherein the noiseless image is obtained by: adjusting an ISO value of an imaging device to lowest for shooting, so as to obtain a noiseless RAW image: dividing pixel values of pixels in the noiseless RAW image by different ratios, to obtain low-light noiseless images with different levels, which are determined as noiseless images in the sample images.

5. The apparatus according to claim 4, further comprising a training module, wherein the training module is specifically configured to:

acquire an initial neural network model and the sample images;

input a low-light image with simulated dead pixels subjected to the preset image enhancement transformation into the initial neural network model;

compute a loss value based on an output result of the initial neural network model and a noiseless image subjected to the preset image enhancement transformation;

adjust a model parameter of the initial neural network based on the loss value, and return to the operation of inputting a low-light image with simulated dead pixels subjected to the preset image enhancement transformation into the initial neural network model, until the initial neural network model converges;

determine the converged initial neural network model as the denoising network model.

6. The apparatus according to claim 4, further comprising a generating module, configured to:

acquire a low-light noise image;

randomly generate a certain number of dead pixels in the low-light noise image based on a pre-determined proportion of dead pixels of a sensor to obtain the low-light image with simulated dead pixels, wherein pixel values of the generated dead pixels are highlighted values, or pixel values of the generated dead pixels and pixel values of surrounding pixels of the generated dead pixels do not meet a preset distribution.

7. An electronic device comprising a processor, a communication interface, a memory and a communication bus, wherein the processor, the communication interface and the memory communicate with each other through the communication bus;

the memory is configured to store computer programs;

the processor is configured to execute the programs stored in the memory to perform the following operations:

acquiring a low-light image in a RAW domain, wherein the low-light image contains noise and dead pixels;

performing a preset image enhancement transformation on the low-light image in the RAW domain, and inputting the transformed image into a pre-trained denoising network model to obtain an output image; wherein, the denoising network model is trained based on sample images, and the sample images comprise a low-light image with simulated dead pixels and a noiseless image;

performing an inverse transformation of the preset image enhancement transformation on the output image to obtain a denoised image;

wherein performing the preset image enhancement transformation on the low-light image in the RAW domain comprises:

sequentially performing normalization and gamma transformation on the low-light image in the RAW domain, wherein the normalization is performed by a formula:

$$x'_{ij} = \frac{x_{ij}}{\max\_b}$$

wherein $x_{ij}$ denotes a pixel value of a pixel with coordinates (i, j) in the low-light image in the RAW domain, max_b denotes a maximum brightness of pixels in the low-light image in the RAW domain, $x'_{ij}$ denotes a pixel value of the pixel with coordinates (i, j) in the normalized low-light image in the RAW domain;

wherein the inverse transformation sequentially includes inverse gamma transformation and inverse normalization transformation;

wherein the noiseless image is obtained by: adjusting an ISO value of an imaging device to lowest for shooting, so as to obtain a noiseless RAW image: dividing pixel values of pixels in the noiseless RAW image by different ratios, to obtain low-light noiseless images with different levels, which are determined as noiseless images in the sample images.

8. A non-transitory computer-readable storage medium having stored therein computer programs which, when executed by a processor, cause the processor to implement the method according to claim 1.

9. The electronic device according to claim 7, wherein the denoising network model is trained by operations of:

acquiring an initial neural network model and the sample images;

inputting a low-light image with simulated dead pixels subjected to the preset image enhancement transformation into the initial neural network model;

computing a loss value based on an output result of the initial neural network model and a noiseless image subjected to the preset image enhancement transformation;

adjusting a model parameter of the initial neural network based on the loss value, and returning to the operation of inputting a low-light image with simulated dead pixels subjected to the preset image enhancement transformation into the initial neural network model, until the initial neural network model converges;

determining the converged initial neural network model as the denoising network model.

10. The electronic device according to claim 7, wherein the low-light image with simulated dead pixels is obtained by operations of:

acquiring a low-light noise image;

randomly generating a certain number of dead pixels in the low-light noise image based on a pre-determined proportion of dead pixels of a sensor to obtain the low-light image with simulated dead pixels, wherein pixel values of the generated dead pixels are highlighted values, or pixel values of the generated dead pixels and pixel values of surrounding pixels of the generated dead pixels do not meet a preset distribution.

\* \* \* \* \*